United States Patent
Enjoji et al.

(10) Patent No.: US 7,135,249 B2
(45) Date of Patent: Nov. 14, 2006

(54) FUEL CELL SEPARATOR, FUEL CELL USING THE SEPARATOR, AND METHOD OF PRODUCING THE SEPARATOR

(75) Inventors: Naoyuki Enjoji, Saitama (JP); Keisuke Andou, Saitama (JP); Kentaro Nagoshi, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 492 days.

(21) Appl. No.: 10/635,734

(22) Filed: Aug. 5, 2003

(65) Prior Publication Data

US 2004/0033412 A1    Feb. 19, 2004

(30) Foreign Application Priority Data

Aug. 6, 2002    (JP)    ............... 2002-228765

(51) Int. Cl.
*H01M 8/02*    (2006.01)
*B05D 5/12*    (2006.01)

(52) U.S. Cl. ........................ 429/38; 427/115

(58) Field of Classification Search .................. 429/34, 429/38, 39; 427/115

See application file for complete search history.

(56) References Cited

U.S. PATENT DOCUMENTS 6,451,471 B1*    9/2002    Braun ....................... 429/34 X
6,531,238 B1*    3/2003    King ........................... 429/38
6,613,469 B1*    9/2003    Keegan ....................... 429/34
6,638,657 B1*   10/2003    Cisar et al. ............... 429/34 X
6,866,958 B1*    3/2005    Vyas et al. ..................... 429/38

FOREIGN PATENT DOCUMENTS

| JP | 11-126620 | 5/1999 |
| JP | 11-162478 | 6/1999 |
| JP | 2000-036309 | 2/2000 |
| JP | 2001-297780 | 10/2001 |

* cited by examiner

*Primary Examiner*—Stephen J. Kalafut
(74) *Attorney, Agent, or Firm*—Lahive & Cockfield, LLP; Anthony A. Laurentano, Esq.

(57) ABSTRACT

A separator 21, 22 for use in a fuel cell that generates electricity by a reaction between fuel and oxidant is disclosed. The separator is formed by metal foam 28 which is impregnated with resin. Gas flow passages 23, 25 are formed on a contact surface for contacting with an electrode 19, 20, and conductive plating is applied on the parts where the metal foam 28 is exposed to view in the contact surface 21*a*, 21*b* of the separator 21, 22.

15 Claims, 3 Drawing Sheets

FUEL CELL SEPARATOR, FUEL CELL USING THE SEPARATOR, AND METHOD OF PRODUCING THE SEPARATOR

FIELD OF THE INVENTION

The present invention relates to a fuel cell, and particularly relates to a fuel cell separator, a fuel cell using the separator, and a method of producing the separator.

BACKGROUND OF THE INVENTION

Fuel cell systems are known as generating devices to take out electric energy generated after electrochemical reaction between fuel and oxidant. An electrolyte module such as a proton-exchange membrane is positioned between a cathode and an anode, and at both sides of the electrolyte module a separator (separator plate) with gas flow channels is arranged respectively to form a unit (cell). In fuel cell systems, a number of such units (cells) are laminated as a fuel cell stack.

Because the separator electrically connects adjacent cells, it is required to have excellent conductivity. Also, because cooling water flows through the separator, it is required to have corrosion resistance. As conventional separators, for example, Japanese Laid-open Patent Application Nos. 11-126620, 11-162478, 2000-36309, and 2000-297780 disclose carbon-made separators such as made of fine carbon graphite and carbon plate, or metal separators such as made of stainless steel.

The separator made of fine carbon graphite excels in conductivity. However, it becomes heavy and thick. Further, because fine carbon graphite is a very fragile material, it is very difficult to apply cutting operations to form a number of protrusions on the surface of the separator for the provision of gas flow passages. This leads to increase in the processing cost.

In the case of the separator made of a carbon plate, it is inferior in conductivity. Further, because carbon plates are not suitable for press working. Therefore, gas flow passages are formed by cutting operations. This leads to increase in the processing cost and weight.

In the case of the metal separator such as made of stainless steel, because such a metal is inferior in corrosion resistance and acid resistance, the separator requires a surface treatment such as by gold plating or platinum plating. This leads to less effective productivity and increase in the production cost. Metal can be used for press working and can be decreased in thickness. However, because of its inferior workability, the production method of gas flow passages undergoes some restrictions, such as a requirement in fine seal. If gas flow passages are formed by etching, the separator becomes heavy and costly.

In view of the above, the present invention seeks to provide a separator which is small and light in weight, and excels in corrosion resistance and conductivity.

SUMMARY OF THE INVENTION

According to the present invention, there is provided a separator for use in a fuel cell that generates electricity by a reaction between fuel and oxidant, wherein the separator is formed by a porous metal material which is impregnated with resin, and wherein gas flow passages are formed on a contact surface for contacting with an electrode that is provided in the fuel cell, and conductive plating is applied on parts where the porous metal material is exposed in the contact surface.

With this construction of the separator, it is possible to provide a light-weight separator having sufficient strength against the required surface pressure upon laminating the cells so as to prevent collapse of the separator. Because the porous metal material is covered by resin, the separator provides corrosion resistance. Further, because conductive plating is applied on contact portions where generated electricity is taken out, the separator ensures excellent conductivity.

In the aforementioned separator, the porous metal material may be metal foam. Instead of the porous metal material, a conductive fiber aggregated material may be used.

In the aforementioned separator, the contact surface is smoothed by machining and thereafter the conductive plating is applied on the parts where the porous metal material is exposed.

With this construction of the separator, because the conductive plating is applied on the parts where the porous metal material is exposed in the contact surface that is smoothed by machining, the contact portions formed by conductive plating protrude slightly from the resinous plane, so as to readily contact with the electrode when the separator is laminated and the contact portions are pressed. This ensures higher conductivity. Further, because conductive plating is merely applied on the contact portions, i.e. the sectional parts of the porous metal material that are exposed in the resinous plane, it is possible to reduce the production cost, even if expensive plating such as by gold or platinum is applied to ensure conductivity and corrosion resistance.

The aforementioned separator may further comprise a structure retaining part in which is provided through openings for supplying the gas flow passages with fluid, and the structure retaining part may be continuously formed around the porous metal material by the resin used for impregnation.

With this construction of the separator, the structure retaining part having through openings is formed by resin, and the porous metal material is not exposed in the surface of the through openings. This can prevent generated electricity from being short circuited through the through openings.

According to a second aspect of the invention, there is provided a fuel cell that generates electricity by a reaction between fuel and oxidant, and the fuel cell comprises the aforementioned separator.

With this construction of the fuel cell, the fuel cell includes a light-weight separator having sufficient strength against the required surface pressure upon laminating the cells so as to prevent collapse of the separator. Further, because conductive plating is applied on contact portions where generated electricity is taken out, it is possible to ensure excellent conductivity and excellent corrosion resistance.

According to a third aspect of the invention, there is provided a method of producing a separator for use in a fuel cell, comprising the steps of: forming a separator by a material wherein cavities of a porous metal material are impregnated with resin; forming gas flow passages on a contact surface for contacting with an electrode that is provided in the fuel cell; smoothing the contact surface by machining to provide a smooth surface with the porous metal material exposed in the contact surface; and applying conductive plating on exposed parts of the porous metal material.

With this construction of the production method for the separator, it is possible to provide a light-weight separator having sufficient strength against the required surface pressure upon laminating the cells so as to prevent collapse of the separator. Because the porous metal material is covered by resin, the separator provides corrosion resistance. Further, after the contact surface is grinded and smoothed by machining, contact portions where generated electricity is taken out are formed by applying conductive plating on the exposed parts of the porous metal material. Therefore, it is possible to ensure excellent conductivity.

In the aforementioned production method, the porous metal material may be metal foam. Instead of the porous metal material, a conductive fiber aggregated material may be used.

BRIEF DESCRIPTION OF THE DRAWINGS

A preferred embodiment of the present invention will be described below, by way of example only, with reference to the accompanying drawings, in which.

DESCRIPTION OF THE PREFERRED EMBODIMENT

With reference to the accompanying drawings, a preferred embodiment of a separator for use in a fuel cell according to the present invention will be described.

Figure 1:
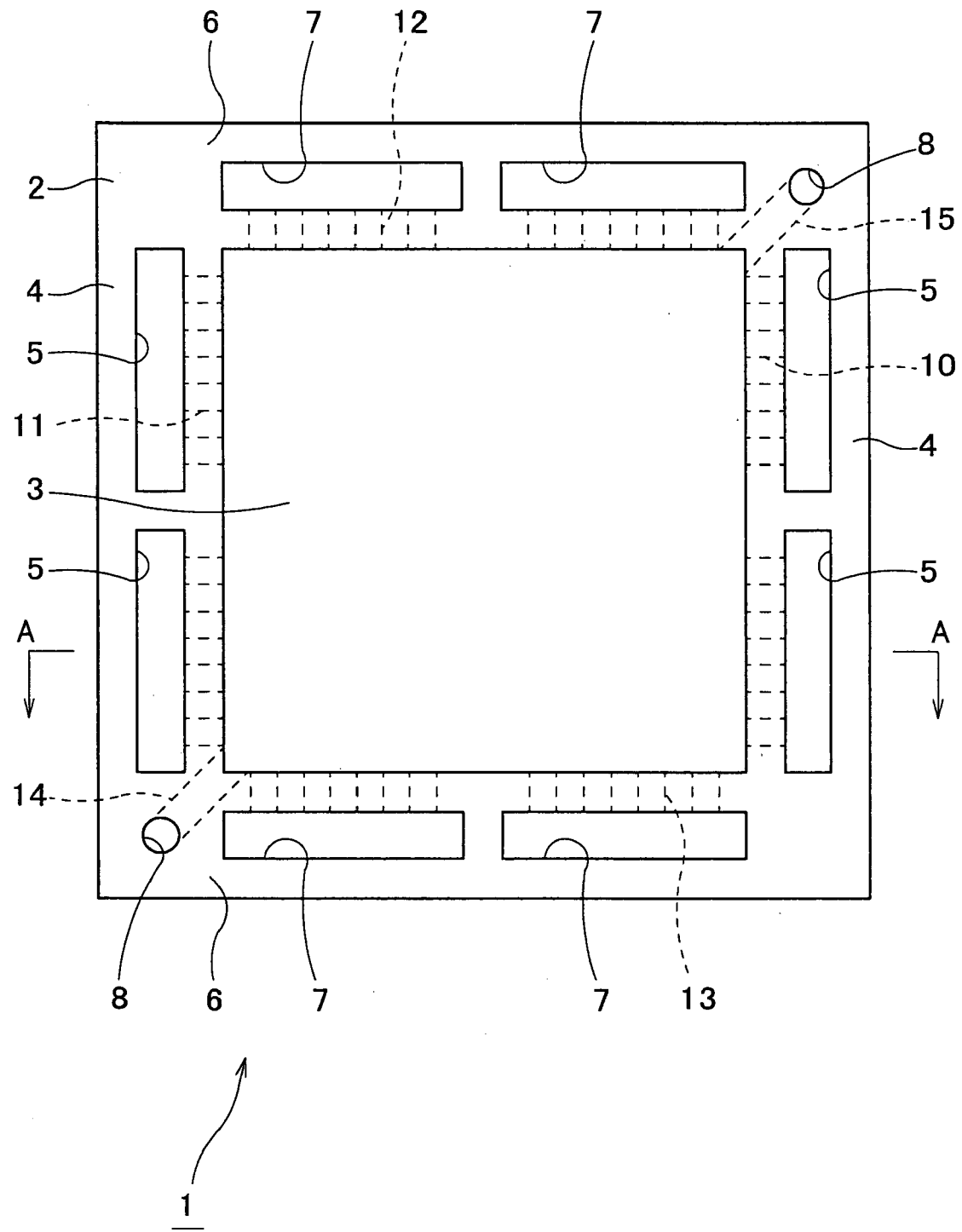
FIG. 1 is a plan view illustrating a separator for use in a fuel cell according to the present invention.
Figure 2:
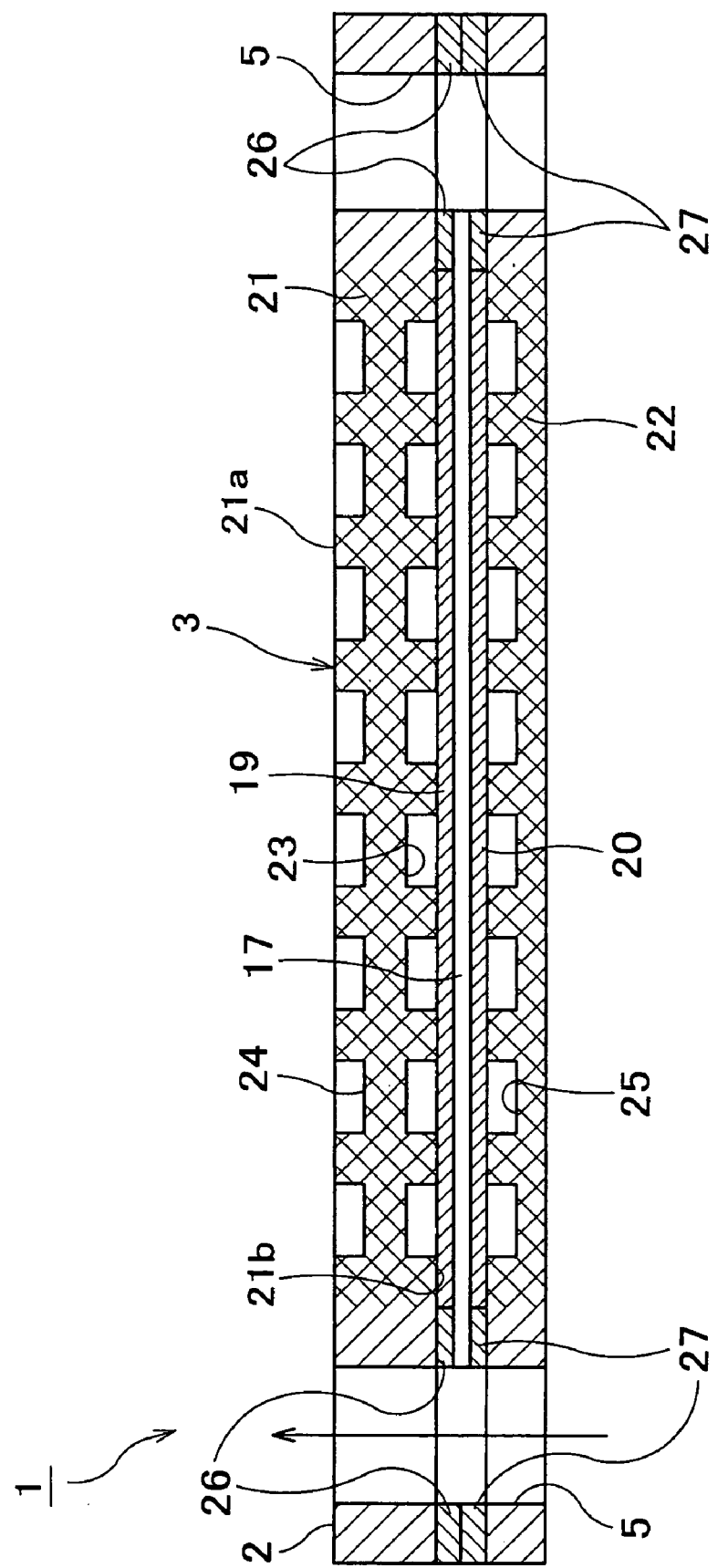
FIG. 2 is a sectional view taken along the line A—A of FIG. 1.

In the drawings to be referred, FIG. 1 is a plan view illustrating a separator for use in a fuel cell according to the present invention, and FIG. 2 is a sectional view taken along the line A—A of FIG. 1.

Fuel cells can be classified into various groups in terms of the electrolyte. However, in this preferred embodiment, explanations will be given in the case of a polymer electrolyte fuel cell to be used as a power source of a vehicle. Hydrogen and oxygen are used as fuel and oxidant. Other than pure hydrogen, hydrogen may be prepared by reforming gasoline, methane gas or the like.

As shown in FIG. 1, a cell 1 of the polymer electrolyte fuel cell includes a structure retaining part 2 in the shape of a square when viewing from top, and a generation function part 3 having an inner space formed inward of the structure retaining part 2. The structure retaining part 2 includes a pair of side frames 4, 4 facing to each other, and other pair of side frames 6, 6 facing to each other. Each side frame 4 is provided with a pair of oxidant gas communication holes (through openings) 5, 5 for flowing fuel. Each side frame 6 is provided with a pair of oxidant gas communication holes (through openings) 7, 7 for flowing oxidant gas. Also, at a pair of corners of the structure retaining part 2 that are diagonally facing to each other, cooling water communication holes (through openings) 8, 8 are formed.

As shown in FIG. 2, these communication holes 5, 7, and 8 are communicated with hydrogen gas flow passages 23, oxidant gas flow passages 25, and cooling water flow passages 24, respectively, through fuel gas supply conduits 10, fuel gas discharge conduits 11, oxidant gas supply conduits 12, oxidant gas discharge conduits 13, a cooling water supply conduit 14, and a cooling water discharge conduit 15.

As best seen in FIG. 2, the generation function part 3 includes a plate-like electrolyte 17, a pair of catalysts (not shown) arranged at both sides of the electrolyte 17 so as to sandwich the electrolyte 17, a pair of plate-like porous electrodes 19, 20 each positioned at the outer side of the catalyst, and separators 21, 22 each positioned at the outer side of the electrode 19, 20.

The plate-like electrolyte 17 is a proton-exchange membrane, and may be made of, for example, fluoropolymer. The catalyst may be, for example, platinum.

Each of the plate-like porous electrodes 19,20 is an electrode which carries a platinum catalyst on fine-grained carbon. As shown in FIG. 2, of the two electrodes 19, 20 positioned outward of the electrolyte 17, any one of the electrodes 19, 20 may function as the anode (hydrogen pole) while the other one functions as the cathode (oxygen pole). In the illustrated example, the upper electrode 19 is for the anode, and the lower electrode 20 is for the cathode.

The separators 21, 22 are formed by a material wherein a porous metal material is impregnated with resin for the purpose of retaining the structure. In this preferred embodiment, the porous metal material is metal foam. The porous metal material may be replaced with conductive fiber aggregated material, such as carbon fiber. Metal foam is prepared by molding the mixture of metal and molding resin in a furnace, and after forming a predetermined shape while the metal is foamed, only the molding resin is melted. The metal foam has a structure such that the remaining part where the molding resin is removed forms reticular cavities.

Various metals may be used for metal foam. In this preferred embodiment, stainless steel powder with corrosion resistance is used as a raw material because it is readily melted. The porosity (volume ratio) except the molding resin may be set arbitrarily. However, in order to achieve a balance between the strength and the lightness in weight of the separators 21, 22, the porosity of 80% or more is preferable. In the separators 21, 22, cavities of the metal foam are impregnated with resin (structure retaining resin), such as phenol resin, epoxy resin, silicon resin, and urethane resin, to form a solid structure. Accordingly, upon laminating the cell 1, it is possible to ensure the strength of the separators 21, 22 against the pressure applied to the cell 1 and to prevent the cell 1 from being collapsed.

Molding resin may be any known resin which does not react with metal and can be melted at relatively low temperatures. For example, expandable thermoplastic resin is preferable.

Hydrogen gas flow passages 23 in the form of a predetermined pattern are formed on the separator 21 at contact surfaces 21a, 21b through which the separator 21 contacts with the electrode 19. Provided at the reverse sides of the contact surfaces 21a, 21b are cooling water flow passages 24 in the form of a predetermined pattern. Similar to this separator 21, oxygen gas flow passages 25 in the form of a predetermined pattern are formed at the contact surface of the separator 22 through which the separator 22 contacts with the electrode 20.

The hydrogen gas flow passages 23 are in communication with the fuel gas supply conduits 10 and the fuel gas discharge conduits 11. The oxygen gas flow passages 25 are in communication with the oxidant gas supply conduits 12 and the oxidant gas discharge conduits 13. Further, the cooling water flow passages 24 are in communication with the cooling water supply conduit 14 and the cooling water discharge conduit 15.

The structure retaining part 2 is continuously formed around the metal foam by the structure retaining resin to be impregnated with respect to the metal foam of the separators 21, 22. Further, the structure retaining part 2 is covered with seals 26, 27 at the parts contacting with the electrodes 19, 20.

As described above, according to the preferred embodiment of the invention, it is possible to provide a light-weight separator 21, 22 having sufficient strength against the required surface pressure upon laminating the cells so as to prevent collapse of the separator 21, 22. Further, because the resin covers the metal foam except for the parts where the metal foam is exposed in the contact surfaces 21a, 21b, it is possible to ensure excellent corrosion resistance.

Because conductive plating 29 is applied on the parts where the metal foam is exposed in the contact surfaces 21a, 21b that are smoothed by machining, the contact portions formed by the conductive plating 29 protrude slightly from the resinous plane, so as to readily contact with the electrode when being laminated and the contact portions are pressed. This ensures higher conductivity. Further, because conductive plating 29 is merely applied on the contact portions, i.e. the sectional parts of the metal foam that are exposed in the resinous plane, it is possible to reduce the production cost, even if expensive plating such as by gold or platinum is applied to ensure conductivity and corrosion resistance.

Further, the structure retaining part 2 having cooling water communication holes 8, 8 is formed by resin, and the metal foam is not exposed in the surface of the cooling water communication holes 8, 8. This can prevent generated electricity from being short circuited through the cooling water communication holes 8, 8.

Figure 3:
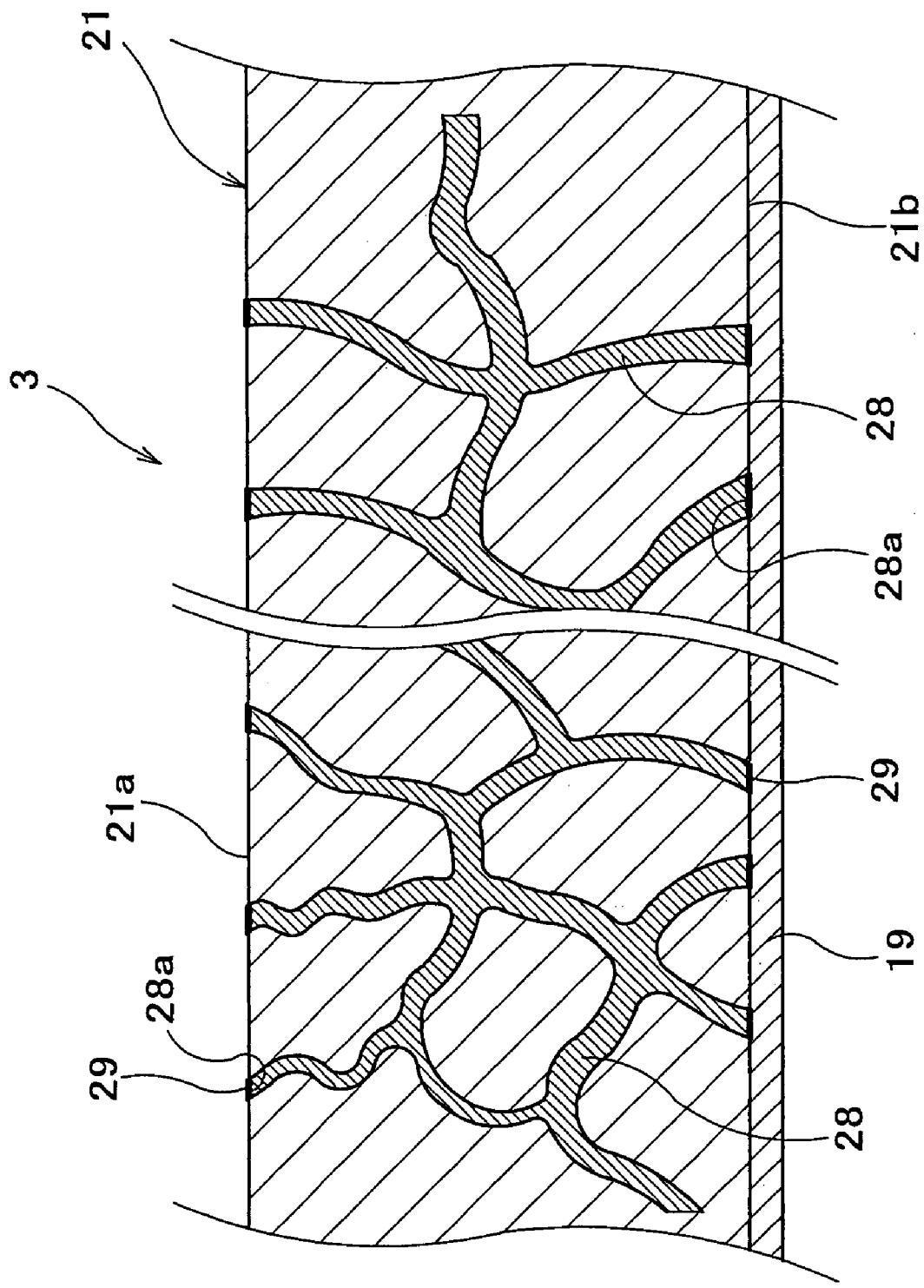
FIG. 3 explains a processe for applying conductive plating on the parts where a porous metal material is exposed to view.

Next, with reference to FIGS. 1 through 3, the production method of the separator according to the present invention will be described.

In the first step, reticular cavities of metal foam 28 are impregnated with molten resin to form a material, followed by molding the separators 21, 22 having a predetermined shape with the use of the material.

In the second step, hydrogen gas flow passages 23 and cooling water flow passages 24 are formed on the contact surfaces 21a, 21b of the separator 21 that contacts with the electrode 19. Oxygen gas flow passages 25 are formed on the contact surface of the separator 22 that contacts with the electrode 20.

In the third step, the contact surfaces 21a, 21b of the separator 21 to be contacted with the electrode 19 (although the contact surface 21a contacts with the electrode of another non-illustrated cell, the electrode is not shown in FIG. 2) are smoothed by machining, so that the metal foam 28 is exposed to view. The same processing is applied to the separator 22. Machining may be carried out by any known method, such as cutting and grinding. However, for the purpose of smoothing the surface, grinding is preferable. The metal foam 28 may be exposed to view in the first step or in the second step. Also, the metal foam 28 may be exposed to view in the third step.

In the fourth step, conductive plating 29 is applied on the parts 28a where the metal foam 28 is exposed to view. Therefore, the separators 21, 22 are completed. Plating 29 is achieved by electroplating, and preferably, gold or platinum is used because of its low contact resistance, excellent conductivity, and excellent corrosion resistance.

While the present invention has been described in detail with reference to a preferred embodiment thereof, it will be apparent to one skilled in the art that various changes and modifications may be made without departing from the scope of the claims.

Although the preferred embodiment has been described in the case of a polymer electrolyte fuel cell, the present invention is applicable to other types of fuel cells.

What is claimed is:

1. A separator for use in a fuel cell that generates electricity by a reaction between fuel and oxidant, wherein the separator is formed by a porous conductive material which is impregnated with resin, and wherein gas flow passages are formed on a contact surface for contacting with an electrode that is provided in the fuel cell, and a conductive plating is applied on parts where the porous conductive material is exposed in the contact surface, wherein the porous conductive material is a porous metal material or a conductive fiber aggregated material;

wherein the separator further includes a structure retaining part having through openings for supplying the gas flow passages with fluid, and wherein the structure retaining part is continuously formed around the porous conductive material by the resin used for impregnation.

2. A separator for use in a fuel cell according to claim 1, wherein said porous metal material is metal foam.

3. A separator for use in a fuel cell according to claim 2, wherein said contact surface is smoothed by machining and thereafter the conductive plating is applied on the parts where the porous conductive material is exposed and wherein the porous conductive material is the porous metal material.

4. A separator for use in a fuel cell according to claim 1, wherein the conductive fiber aggregated material is carbon fiber.

5. A separator for use in a fuel cell according to claim 4, wherein said contact surface is smoothed by machining and thereafter the conductive plating is applied on the parts where the porous conductive material is exposed and wherein the porous conductive material is the conductive fiber aggregated material.

6. A separator for use in a fuel cell according to claim 1, wherein said contact surface is smoothed by machining and thereafter the conductive plating is applied on the parts where the porous conductive material is exposed.

7. A separator for use in a fuel cell according to claim 1, wherein the conductive plating is applied only on parts where the porous conductive material is exposed.

8. A fuel cell comprising the separator of claim 1.
9. A fuel cell comprising the separator of claim 2.
10. A fuel cell comprising the separator of claim 4.
11. A fuel cell comprising the separator of claim 6.

12. A method of producing a separator for use in a fuel cell, comprising the steps of:

forming a separator by a material wherein cavities of a porous conductive material are impregnated with resin;

forming gas flow passages on a contact surface for contacting with an electrode that is provided in the fuel cell;

smoothing the contact surface by machining to provide a smooth surface with the porous conductive material exposed in the contact surface; and applying conductive plating on exposed parts of the porous conductive material, wherein the porous conductive material is a porous metal material or conductive fiber aggregated material, wherein the separator further includes structure retaining part having through openings for supplying the gas flow passages with fluid, and wherein the structure retaining part is continuously formed around the porous conductive material by the resin used for impregnation.

13. A method of producing a separator for use in a fuel cell according to claim 12, wherein the porous conductive material is the porous metal material and the porous metal material is metal foam.

14. A method of producing a separator for use in a fuel cell according to claim 12, wherein the porous conductive material is the conductive fiber aggregated material.

15. A method of producing a separator for use in a fuel cell according to claim 12, wherein the conductive plating is applied only on parts where the porous conductive material is exposed.

* * * * *